United States Patent
Wilson et al.

(10) Patent No.: US 12,309,549 B2
(45) Date of Patent: May 20, 2025

(54) HEARING SYSTEM CONTAINING A HEARING INSTRUMENT AND A METHOD FOR OPERATING THE HEARING INSTRUMENT

(71) Applicant: Sivantos Pte. Ltd., Singapore (SG)

(72) Inventors: Cecil Wilson, Erlangen (DE); Maja Serman, Erlangen (DE)

(73) Assignee: Sivantos Pte. Ltd., Singapore (SG)

( * ) Notice: Subject to any disclaimer, the term of this patent is extended or adjusted under 35 U.S.C. 154(b) by 362 days.

(21) Appl. No.: 17/988,944

(22) Filed: Nov. 17, 2022

(65) Prior Publication Data
US 2023/0156410 A1    May 18, 2023

(30) Foreign Application Priority Data
Nov. 17, 2021    (EP) ..................................... 21208840

(51) Int. Cl.
    *H04R 25/00*      (2006.01)
    *G10L 15/08*      (2006.01)

(52) U.S. Cl.
    CPC ............ *H04R 25/505* (2013.01); *G10L 15/08* (2013.01); *H04R 2225/41* (2013.01)

(58) Field of Classification Search
    CPC .............. H04R 25/505; H04R 2225/41; H04R 2225/43; G10L 21/02
See application file for complete search history.

(56) References Cited

U.S. PATENT DOCUMENTS

| | | | |
|---|---|---|---|
| 8,644,534 B2* | 2/2014 | Yamada | G10L 25/48 381/313 |
| 9,179,225 B2* | 11/2015 | Takagi | H04R 25/552 |
| 10,349,189 B2 | 7/2019 | Kamkar-Parsi et al. | |
| 11,115,762 B2* | 9/2021 | Sigwanz | G10L 25/51 |
| 11,375,322 B2* | 6/2022 | Lunner | H04R 25/505 |
| 11,388,528 B2 | 7/2022 | Hannemann et al. | |
| 12,160,707 B2* | 12/2024 | Eng | G10L 17/26 |
| 2013/0148829 A1 | 6/2013 | Lugger | |
| 2021/0306771 A1 | 9/2021 | El Guindi | |
| 2023/0045237 A1* | 2/2023 | Wexler | G06V 40/20 |
| 2023/0336694 A1* | 10/2023 | Wexler | G06V 20/52 |

FOREIGN PATENT DOCUMENTS

| | | |
|---|---|---|
| EP | 3337189 A1 | 6/2018 |
| EP | 3618456 A1 | 3/2020 |
| EP | 3641344 A1 | 4/2020 |

(Continued)

*Primary Examiner* — Ryan Robinson
(74) *Attorney, Agent, or Firm* — Laurence A. Greenberg; Werner H. Stemer; Ralph E. Locher

(57) ABSTRACT

A hearing system includes a hearing instrument and a method for operating the hearing instrument. Therein, a sound signal is captured from an environment of the hearing instrument. The captured sound signal is analyzed to recognize own-voice intervals, in which the user speaks. The captured sound signal is analyzed, during recognized own-voice intervals, to determine a rate of speech of the user. The captured sound signal is processed in dependence of a set of signal processing parameters, and the processed sound signal is output to a user of the hearing instrument. The set of signal processing parameters is adapted if the determined rate of speech falls below a threshold.

16 Claims, 1 Drawing Sheet

(56) References Cited

FOREIGN PATENT DOCUMENTS

| EP | 3641345 A1 | 4/2020 |
| EP | 3873110 A1 | 9/2021 |
| WO | 2016078786 A1 | 5/2016 |
| WO | 2021122082 A1 | 6/2021 |
| WO | 2021122092 A1 | 6/2021 |

* cited by examiner

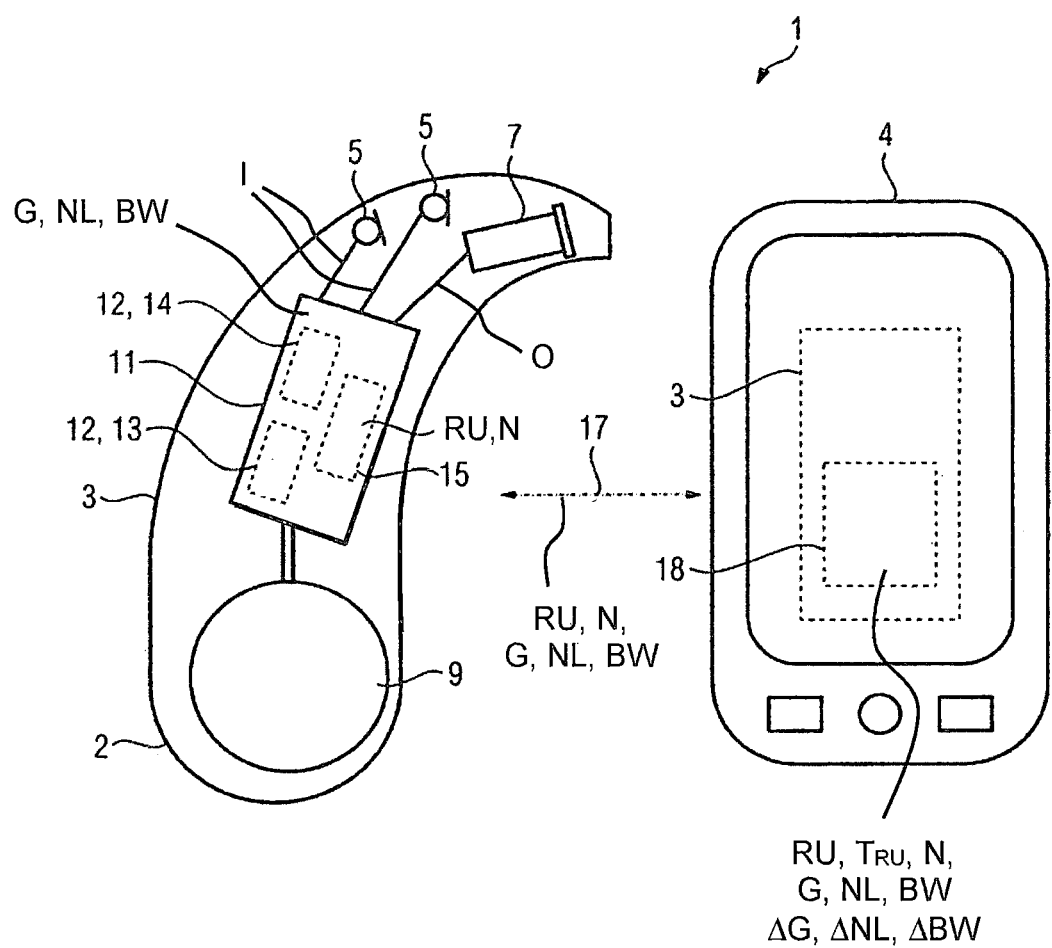

HEARING SYSTEM CONTAINING A HEARING INSTRUMENT AND A METHOD FOR OPERATING THE HEARING INSTRUMENT

CROSS-REFERENCE TO RELATED APPLICATION

This application claims the priority, under 35 U.S.C. § 119, of European Patent Application EP 21 208 840.5, filed Nov. 17, 2021; the prior application is herewith incorporated by reference in its entirety.

FIELD AND BACKGROUND OF THE INVENTION

The invention relates to a method for operating a hearing instrument. The invention further relates to a hearing system containing a hearing instrument.

Generally, a hearing instrument is an electronic device being configured to support the hearing of person wearing it (which person is called the user or wearer of the hearing instrument). In particular, the invention relates to a hearing aid, i.e., a hearing instrument that is specifically configured to at least partially compensate a hearing impairment of a hearing-impaired user. Other types of hearing instruments are configured to support the hearing of users with normal hearing, i.e., to improve speech perception in complex acoustic situations.

Hearing instruments are most often designed to be worn in or at the ear of the user, e.g., as a Behind-The-Ear (BTE) or In-The-Ear (ITE) instrument. With respect to its internal structure, a hearing instrument normally contains an (acousto-electric) input transducer, a signal processor and an output transducer. During operation of the hearing instrument, the input transducer captures a sound signal from an environment of the hearing instrument and converts it into an input audio signal (i.e., an electric signal transporting a sound information). In the signal processor, the captured sound signal (i.e., input audio signal) is processed, in particular amplified dependent on sound frequency, to support the hearing of the user, in particular to compensate a hearing-impairment of the user. The signal processor outputs a processed audio signal (also called processed sound signal) to the output transducer. Most often, the output transducer is an electro-acoustic transducer (also called "receiver") that converts the processed sound signal into a processed airborne sound, which is emitted into the ear canal of the user. Alternatively, the output transducer may be an electro-mechanical transducer that converts the processed sound signal into a structure-borne sound (vibrations) that is transmitted, e.g., to the cranial bone of the user. Furthermore, besides classical hearing instruments as described before, there are implanted hearing instruments such as cochlear implants, and hearing instruments the output transducers of which output the processed sound signal by directly stimulating the auditory nerve of the user.

The term "hearing system" denotes one device or an assembly of devices and/or other structures providing functions required for the operation of a hearing instrument. A hearing system may consist of a single stand-alone hearing instrument. As an alternative, a hearing system may comprise a hearing instrument and at least one further electronic device, which may be, e.g., one of another hearing instrument for the other ear of the user, a remote control and a programming tool for the hearing instrument. Moreover, modern hearing systems often comprise a hearing instrument and a software application for controlling and/or programming the hearing instrument, which software application is or can be installed on a computer or a mobile communication device such as a mobile phone (smart phone). In the latter case, typically, the computer or the mobile communication device are not a part of the hearing system. In particular, most often, the computer or the mobile communication device will be manufactured and sold independently of the hearing system.

A hearing instrument user's listening effort and speech understanding is highly dependent on the listening situation. Modern hearing instruments usually can recognize demanding listening situations in which user might need additional support for increasing speech understanding and reducing listening effort through various means. Mostly, such demanding listening situations are recognized by analysing measurable properties of the acoustic situations around the user, i.e. the presence and loudness of noise, loudness of a target speaker or source, the directions of the source and interfering noise, etc. In some modern hearing instruments, acoustic classifiers are used to recognize pre-defined listening situations and to specifically adapt the signal processing parameters of the hearing instrument to these situations. Moreover, signals of non-acoustic sensors can be used to recognise demanding situations in which the user requires additional support by the hearing instrument.

However, the before-mentioned means do not always suffice to recognize the user's need of support.

Furthermore, European patent application EP 3 641 344 A1 (corresponding to U.S. Pat. No. 11,388,528) discloses a method for operating a hearing instrument, wherein a sound signal is captured from an environment of the hearing instrument. The captured sound signal is analysed to recognize own-voice intervals, in which the user speaks. During recognized own-voice intervals, the captured sound signal is analysed, i.e., to determine at least one acoustic feature of the own voice of the user, e.g. rate (speed) of speech of the user. The acoustic feature of the own voice of the user or a measure of an emotional state of the user derived thereof are tested with respect to a pre-defined criterion, and a value of at least one signal processing parameter of the hearing instrument is adapted to change the emotional state of the user if the criterion is fulfilled.

SUMMARY OF THE INVENTION

An object of the present invention is to provide a method for operating a hearing instrument which method provides further improved speech perception to a user wearing the hearing instrument.

Another object of the present invention is to provide a hearing system containing a hearing instrument which system provides further improved speech perception to a user wearing the hearing instrument.

According to a first aspect of the invention, a method for operating a hearing instrument that is configured to support the hearing of a user (in particular a hearing-impaired user) is provided. The method includes capturing a sound signal from an environment of the hearing instrument, e.g., by an input transducer of the hearing instrument. The captured sound signal is processed in dependence of a set of signal processing parameters, e.g., by a signal processor of the hearing instrument (in particular to at least partially compensate the hearing-impairment of the user), thus producing a processed sound signal. The processed sound signal is output to the user, e.g., by an output transducer of the hearing instrument. In preferred embodiments, the captured sound signal and the processed sound signal, before being output to the user, are audio signals, i.e., electric signals transporting a sound information.

The hearing instrument may be of any type as specified above. Preferably, it is configured to be worn in or at the ear of the user, e.g., as a BTE hearing instrument (with internal or external receiver) or as an ITE hearing instrument. Alternatively, the hearing instrument may be configured as an implantable hearing instrument. The processed sound signal may be output as air-borne sound, as structure-borne sound or as a signal directly stimulating the auditory nerve of the user.

According to the invention, the captured sound signal is analysed to recognize own-voice intervals (OV intervals), in which the user speaks. During recognized OV intervals, the captured sound signal is analysed to determine a rate of speech of the user. In an adaptation step the set of signal processing parameters is adapted if the determined rate of speech falls below a (pre-defined or pre-determined) threshold.

Herein, the set of signal processing parameters may be adapted in one single step, in a plurality of steps, being attributed to a series of thresholds or in a smooth step, i.e. as a continuous function of time or of the determined rate of speech.

Generally, adapting the set of signal processing parameters means adapting one of the signal processing parameters or a combination of the signal processing parameters included in that set. In other words, in the previously described adaptation step, at least one signal processing parameter is adapted. Adapting a signal processing parameter means altering the value of that signal processing parameter.

In accordance with the invention, the set of signal processing parameters can be instantly adapted, as soon as the determined rate of speech falls below the threshold. However, preferably, the adaptation is only executed if the determined rate of speech undershoots the threshold for more than a pre-defined time interval (which, subsequently, is referred to as the "reaction time"), in order to avoid frequent adaptations that may disturb the user. Additionally or alternatively, the rate of speech may be determined as a time-averaged quantity, wherein the time-averaging also avoids frequent adaptations that may disturb the user. Thus, by waiting for the pre-defined reaction time and by time-averaging the rate of speech, the same effect is achieved. In a suited realization, the reaction time or a time window for averaging the rate of speech may be set to a value between 30 seconds and 5 minutes, in particular to 1 minute. The reaction time or a time window may be adaptive and tailored for the individual user. Optionally, it can be adjusted by the audiologist. As the user's rate of speech can only be determined within OV intervals, i.e. if and as long as the user does not speak, the reaction time or the time window for averaging the rate of speech are interrupted outside OV intervals and may, thus, extend over a plurality of consecutive OV intervals.

The invention is based on the finding that conversation partners typically slow down the speech rate if a conversation is not easily comprehendible for them and, thus, causes an enhanced listening effort. In consequence, according to the invention, an abnormally low rate of speech of the user is taken as an indication of additional support being required by the user. Thus, the signal processing in the hearing instrument is adapted based on live assessment of listening effort. By adapting the set of signal processing parameters in response to detecting an abnormally low rate of speech, an improved speech perception and a reduced listening effort of the user can be achieved.

In a preferred embodiment of the invention, the set signal processing parameters includes at least one of a gain applied to the captured sound signal, a parameter of a noise reduction algorithm, and a parameter of a beamforming algorithm. Preferably, the gain is increased and/or the noise reduction is increased and/or the directionality of the signal processing is increased (i.e. the beam width of a beamforming algorithm is reduced), if the determined rate of speech falls below the threshold.

In a further embodiment, onset enhancement (e.g. as described in EP 3 823 306 A1, corresponding to U.S. patent publication No. 20210152949) is applied to foreign voice included in the captured sound signal in order to improve speech intelligibility. In this case, at least one of the signal processing parameters may be provided to switch on and off the onset enhancement or to adjust the strength of the onset enhancement.

Preferably, the rate of speech is determined based on at least one of the word duration, the rate of syllables (i.e. the occurrence of syllables per time, in particular syllables per second, in the user's speech), the rate of words (i.e. the occurrence of words per time, in particular words per second, in the user's speech), and the pauses (i.e. the time intervals) between consecutive words in the user's speech. Herein, the rate of speech can be determined from a single one of said quantities (e.g. rate of syllables can be taken as the rate of speech) or from a combination (e.g. a weighted average) of a plurality of said quantities. By preference, the before-mentioned quantities (i.e. word duration, rate of syllables, rate of words and/or pauses between words) are determined as time-averaged values.

In advantageous embodiments of the invention, the threshold is adapted to the usual rate of speech of the individual user. Herein, in accordance with the invention, the threshold may be fixedly pre-defined, e.g. by an audiologist. However, preferably, the threshold is determined by analyzing the usual rate of speech of the user during a test period. Typically, the test period precedes the normal operation of the hearing instrument (and, in particular, the adaptation step). E.g., the test period may be chosen to be within a training phase, in which the hearing instrument is fitted to the individual requirements of the user. Preferably, during the test period, the usual rate of speech of the user is acquired by the hearing instrument, in particular using the input transducer and electronics of the hearing instrument. However, within the scope of the invention, during the test period, the user's voice may also be captured and—optionally—analyzed outside the hearing instrument, using a separate part of the hearing system. E.g., the user's voice may be captured using a software that is installed on a smart phone. In a suited embodiment of the method, the threshold is determined once during an initial fitting process in which the settings of the hearing instrument are initially adapted to the needs and preferences of the individual user. Alternatively, the determination of the threshold can be provided such that it can be repeated in regular intervals or on demand of the user or an audiologist. In yet another embodiment of the invention, the usual rate of speech from which the threshold is derived, may be collected in own-voice intervals during the normal operation of the hearing instrument.

In a further embodiment, the captured sound signal is further analyzed for at least one environmental acoustic feature that characterizes a listening situation of the user. Preferably, the at least one environmental acoustic feature is selected from one of a sound level of the captured sound signal, a noise level, the signal-to-noise ratio, and a reverberation time. Additionally or alternatively, the at least one environmental acoustic feature may include an output of a classifier for recognizing listening situations, i.e. a variable indicating one of a plurality of classified listening situations. Herein, in an embodiment of the invention, the threshold is determined in dependence of the at least one environmental acoustic feature. Additionally or alternatively, the adaptation of the set of signal processing parameters is varied in dependence of the at least one environmental acoustic feature. In other words, the threshold and/or the adaptation is different for different listening situations.

In a particular embodiment, the number of different speakers is determined as the least one environmental acoustic feature that characterizes a listening situation of the user; e.g., the number of foreign speakers (which number may include one) may be determined using beamforming (e.g. region beams as described in EP 3 337 189 A1, corresponding to U.S. Pat. No. 10,349,189). Herein, the threshold and/or the adaptation of said set of signal processing parameters is varied in dependence of the determined number of foreign speakers. For instance, the threshold is increased and/or directionality is decreased, if a plurality of different speakers is detected. Additionally or alternatively, a different threshold may be attributed to each one of a plurality of detected foreign speakers.

In a further embodiment of the invention, the adaptation of the set of signal processing parameters is varied if the desired effect is not achieved (i.e. if the determined rate of speech continues to undershoot the threshold) for more than a pre-defined time interval (referred to, subsequently, as the "validation time") from said the adaptation. Thus, the effectiveness of additional support provided by the adaptation is validated by analyzing the variation of the rate of speech afterwards, and the adaptation is varied in case of low effectiveness. In a suited realization, the validation time may be set to a value between 30 seconds and 5 minutes, in particular to 1 minute. For instance, adaptation of the set of signal processing parameters may be varied by increasing the amount of adaptation and/or by adapting a different sub-set of the signal processing parameters. In order to find a better adaptation, the adaptation of said set of signal processing parameters may be varied, e.g., randomly or by an optimization algorithm.

If otherwise, after the adaptation of the set of signal processing parameters, the desired effect is achieved and, thus, the determined rate of speech continuously exceeds the threshold for more than a pre-defined time interval (referred to, subsequently, as the "reset time"), then, preferably, the adaptation of the set of signal processing parameters is reversed. By reversing the adaptation in case of success, a habituation of the user to the adapted set of signal processing parameters is avoided, thereby preventing a gradual loss of effectiveness of the method. Preferably, the adaptation is slowly and continuously reversed and, in particular, imperceptible for the user. Preferably, the reset-time starts when the determined speech rate starts to exceed the threshold after the adaptation. Optionally, time intervals outside OV intervals are not considered when counting the reset time and, thus, do not contribute to the latter. In a suited realization, the reset time may be set to a value between 2 minutes and 15 minutes, in particular to 5 minutes.

In an embodiment of the invention, the captured sound signal is further analyzed to recognize foreign-voice intervals, in which a different speaker (i.e. a speaker different from the user) speaks. During such recognized foreign-voice intervals, the captured sound signal is analyzed to determine a rate of speech of the different speaker. Herein, the adaptation of the set of signal processing parameters is varied in dependence of the determined rate of speech of the different speaker. Determining and analyzing the rate of speech of the different speaker (in addition to determining and analyzing the user's rate of speech allows for an improved evaluation of a detected abnormal decrease of the user's rate of speech and for an improved selection of a suited adaptation of signal processing parameters).

In a specific embodiment, the information of the different speaker's rate of speech is used to distinguish different cases for which a different reaction (e.g. adaptation of signal processing parameters) is chosen. Generally, if both the user and the different speaker(s) are found to have a reduced rate of speech, then the situation is considered difficult. If, on the other hand, the different speaker alone is found to slow down, then this finding is taken as an indication to poor perception of the user.

In particular, in an embodiment, five cases are distinguished:

| Nr. | Finding | Conclusion | Reaction |
| --- | --- | --- | --- |
| 1 | Different speaker and user lower rate of speech | Poor perception in a non-complex environment (e.g. unknown accents) | Onset enhancement is used on the foreign voice |
| 2 | Different speaker and user lower rate of speech plus at least one further indicator indicates a complex scenario | complex overall listening situation (e.g. noisy situation) | Noise reduction is increased, optionally together with further measures enhancing speech intelligibility |
| 3 | only user lowers rate of speech, whereas the different speaker(s) maintain(s) a normal rate of speech | user-specific perception problem that is not acknowledged by the different speaker | directivity (beamforming) is increased |
| 4 | only the different speaker lowers rate of speech, whereas the user maintains a normal rate of speech | unacknowledged case of poor perception by hearing aid user (the user is not aware of lost conversation details and partners are trying to help by slowing down) | directivity (beamforming) is increased and/or onset enhancement is used on the foreign voice |
| 5 | both different speaker and user maintain normal rate of speech | sufficient perception | default setting of the signal processing parameters |

Herein, implementation of case 4 is optional.

According to a second aspect of the invention, a hearing system with a hearing instrument is provided. The hearing instrument contains:
  an input transducer configured to capture a sound signal from an environment of the hearing instrument,
  a signal processor configured to process the captured sound signal in dependence of a set of signal processing parameters, and
  an output transducer configured to emit a processed sound signal to the user.

In particular, the input transducer converts the sound signal into an input audio signal that is fed to the signal processor, and the signal processor outputs an output audio signal to the output transducer which converts the output audio signal into the processed sound signal.

Generally, the hearing system according to second aspect of the invention is configured to automatically perform the method according to the first aspect of the invention. To this end, the system comprises a voice recognition unit that is configured to analyze the captured sound signal to recognize the own-voice intervals. The system further comprises an analysis unit that is configured to analyze the captured sound signal to determine a rate of speech of the user, and a control unit configured to adapt said set of signal processing parameters if the determined rate of speech falls below the threshold.

Preferably, the signal processor is configured as a digital electronic device. It may be a single unit or consist of a plurality of sub-processors. The signal processor or at least one of the sub-processors may be a programmable device (e.g. a microcontroller). In this case, the functionality mentioned above or part of said functionality may be implemented as software (in particular firmware). Also, the signal processor or at least one of said sub-processors may be a non-programmable device (e.g. an ASIC). In this case, the functionality mentioned above or part of the functionality may be implemented as hardware circuitry.

In a preferred embodiment of the invention, the voice recognition unit is arranged in the hearing instrument. In particular, it may be a hardware or software component of the signal processor. In a preferred embodiment, it comprises an own voice detection (OVD) module for detection of the user's own voice and, optionally, a voice activity detection (VAD) module for general voice detection, independent of a specific speaker. However, in other embodiments of the invention, the voice recognition unit or at least a functional part thereof may be located in an external electronic device. Optionally, the voice recognition unit may comprise a software component for recognizing a foreign voice (i.e. a voice of a speaker different from the user) that may be implemented as a part of a software application to be installed in the hearing instrument or an external communication device (e.g. a computer, a smartphone, etc.).

Preferably, the analysis unit is arranged in the hearing instrument, e.g. as a hardware or software component of the signal processor. Alternatively, at least a functional part of the analysis unit may also be configured as a part of a software application to be installed on an external communication device (e.g. a computer, a smartphone, etc.).

The control unit may be arranged in the hearing instrument, e.g. as a hardware or software component of the signal processor. However, preferably, the control unit is arranged as a part of a software application to be installed on an external communication device (e.g. a computer, a smartphone, etc.).

For each embodiment or variation of the method according to the first aspect of the invention there is a corresponding embodiment or variation of the hearing system according to the second aspect of the invention. Thus, disclosure related to the method also applies, mutatis mutandis, to the hearing system, and vice-versa.

In particular, in an embodiment of the hearing system, the set of signal processing parameters that is adapted by the control unit includes at least one of a gain applied to the captured sound signal, a parameter of a noise reduction algorithm, and a parameter of a beamforming algorithm;

In a further embodiment of the hearing system, the analysis unit is configured to determine the rate of speech based on at least one of word duration, rate of syllables, rate of words, and pauses between consecutive words.

In a further embodiment of the hearing system, the control unit is configured to determine said threshold by analyzing the rate of speech of the user during a test period.

In a further embodiment of the hearing system, the analysis unit is configured to analyze the captured sound signal for at least one environmental acoustic feature, as described above. Herein, the control unit is configured to determine the threshold in dependence of the at least one environmental acoustic feature. Additionally or alternatively, the control unit is configured to vary the adaptation of said set of signal processing parameters in dependence of the at least one environmental acoustic feature.

In a further embodiment of the hearing system, the control unit is configured to vary the adaptation of the set of signal processing parameters if the determined rate of speech continues to undershoot the threshold for more than the pre-defined evaluation time (as described above).

In a further embodiment of the hearing system, the control unit is configured to reverse the adaptation of the set of signal processing parameters if the determined rate of speech continuously exceeds the threshold for more than the pre-defined reset time (as described above).

In a further embodiment of the hearing system, the voice recognition unit is configured to analyze the captured sound signal to recognize foreign-voice intervals, in which a different speaker speaks. Herein, the analysis unit is configured to analyze the captured sound signal, during recognized foreign-voice intervals, to determine a rate of speech of the different speaker. The control unit is configured to vary the adaptation of the set of signal processing parameters in dependence of the determined rate of speech of the different speaker.

Other features which are considered as characteristic for the invention are set forth in the appended claims.

Although the invention is illustrated and described herein as embodied in a hearing system containing a hearing instrument and a method for operating the hearing instrument, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE FIGURE

The single FIGURE of the drawing is a schematic representation of a hearing system containing a hearing aid and a software application (hearing app) that is installed on a smartphone.

DETAILED DESCRIPTION OF THE INVENTION

Like reference numerals indicate like parts, structures and elements unless otherwise indicated.

Turning now to the single FIGURE of the drawing, there is shown a hearing system 1 containing a hearing aid 2, i.e. a hearing instrument being configured to support the hearing of a hearing-impaired user, and a software application (subsequently denoted "hearing app" 3), that is installed on a smartphone 4 of the user. Here, the smartphone 4 is not a part of the system 1. Instead, it is only used by the system 1 as a resource providing computing power and memory. Generally, the hearing aid 2 is configured to be worn in or at one of the ears of the user. As shown in the FIGURE, the hearing aid 2 may be configured as a behind-the-ear (BTE) hearing aid.

Optionally, the system 1 contains a second hearing aid (not shown) to be worn in or at the other ear of the user to provide binaural support to the user. In the latter case, both the hearing aid 2 and the other hearing aid are wirelessly connected for exchange of audio signals to perform binaural signal processing.

The hearing aid 2 contains two microphones 5 as input transducers and a receiver 7 as output transducer. The hearing aid 2 further contains a battery 9 and a (digital) signal processor 11. Preferably, the signal processor 11 contains both a programmable sub-unit (such as a microprocessor) and a non-programmable sub-unit (such as an ASIC). The signal processor 11 includes a voice recognition unit 12, that contains a voice activity detection (VAD) module 13 and an own voice detection (OVD) module 14. By preference, both modules 13 and 14 are designed as software components being installed in the signal processor 11. The signal processor 11 also includes an analysis unit 15, which may be designed as a software module or a hardware circuit.

During operation of the hearing aid 2, the microphones 5 capture a sound signal from an environment of the hearing aid 2. Each one of the microphones 5 converts the captured sound signal into a respective input audio signal I that is fed to the signal processor 11. The signal processor 11 processes the input audio signals I of the microphones 5, i.e., to provide a directed sound information (beamforming), to perform noise reduction and to individually amplify different spectral portions of the audio signals based on audiogram data of the user to compensate for the user-specific hearing loss. Hereby, the signal processing performed by the signal processor 11 depends on a plurality of (e.g. more than 200) signal processing parameters that are set to specific values during a fitting process, i.e. during adapting the hearing aid 2 to the needs of the individual user. The signal processor 11 emits an output audio signal O to the receiver 7. The receiver 7 converts the output audio signal O into a processed sound signal that is emitted into the ear canal of the user.

The VAD module 13 generally detects the presence or absence of voice (independent of a specific speaker) in the input audio signals I, whereas the OVD module 14 specifically detects the presence or absence of the user's own voice. By preference, modules 13 and 14 apply technologies of VAD and OVD, that are as such known in the art, e.g. from U.S. patent publication 2013/0148829 A1 or international patent disclosure WO 2016/078786 A1. The OVD module 14, thus, indicates own-voice intervals (OV-intervals) in which the user speaks.

During recognized OV intervals, i.e. periods of time in which OVD module 14 detects the presence of the user's own voice in the input audio signals I or a signal derived therefrom, the analysis unit 15 analyses the input audio signal to determine a rate of speech RU of the user. Moreover, optionally, the analysis unit 15 determines at least one environmental acoustic feature from the input audio signals I.

In a simple example, the analysis unit 15 determines a sliding time average of the word duration during OV intervals as rate of speech RU of the user. As the sliding average is determined within a (temporal) averaging window of, e.g., 1 minute. Hereby, as the user's rate of speech RU is only determined within OV intervals, the averaging window may extend over a plurality of OV intervals; time intervals outside OV intervals do not contribute to the averaging window.

In alternative example, a sliding time average of the rate of syllables, the rate of words, and the pauses between consecutive words in the user's speech are determined as the rate of speech RU of the user.

In a further (more refined) example, the rate of speech RU of the user is determined from a weighted average of two or more of the above-mentioned quantities (duration of words, rate of syllables, rate of words, and pauses between consecutive words). Herein, preferably, each of the quantities from which the weighted average is formed is determined as time averaged value as described above and normalized (divided) by a typical value for the respective quantity. For a typical speaker, the thus determined rate of speech RU is close to 1 under normal conditions.

In the embodiment shown in the FIGURE, the analysis unit 15 determines the noise level N (i.e. the sound level of the sound contained in the input audio signal that does not include speech) as the at least one environmental acoustic feature. Additionally or alternatively, the analysis unit 15 includes a classifier that is configured to recognize one of a plurality of classified listening situation (such like "speech in quiet", "speech in noise", "speech in music", etc.) by analyzing the input audio signal. In the latter case, preferably, a classifier output of said classifier indicating a recognized listening situation is determined as the at least one environmental acoustic feature.

The hearing aid 2 and the hearing app 3 exchange data via a wireless link 17, e.g. based on the Bluetooth standard. To this end, the hearing app 3 accesses a wireless transceiver (not shown) of the smartphone 4, in particular a Bluetooth transceiver, to send data to the hearing aid 2 and to receive data from the hearing aid 2. In particular, during operation of the hearing aid 2, the VAD module 13 sends signals indicating the detection or non-detection of general voice activity to the hearing app 3. Likewise, the OVD module 14 sends signals indicating the detection or non-detection of own voice activity to the hearing app 3. Moreover, the analysis unit 15 sends the determined values of the rate of speech RU of the user and, optionally, the noise level N and/or the classifier output to the hearing app 3.

The hearing app 3 includes a control unit 18 that is configured to compare current value of rate of speech RU of the user with a predetermined threshold $T_{RU}$. If the rate of speech RU falls below the threshold $T_{RU}$ (RU<$T_{RU}$), then the control unit 18 adapts a given set of signal processing parameters including, e.g.:
  an overall (i.e. frequency independent) gain G to be applied to the input audio signals I during signal processing;
  a parameter of a noise cancelling algorithm indicating the level of noise cancelling (which parameter is referred to as the noise cancelling level NL); and
  a parameter of a beamforming algorithm indicating the width of a directionality pattern applied to the input audio signals I during beamforming (which parameter is referred to as the beamforming width BW),
  according to pre-defined rules that may be defined, e.g., as a lookup-table providing values of:
    a step $\Delta G$ by which the gain G is increased,
    a step $\Delta NL$ by which the noise cancelling level NL is increased and
    a step $\Delta BW$ by which the beamforming width BW is reduced.

Herein, the lookup table contains different values of the steps ΔG, ΔNL, ΔBW for different values of the noise level N and/or the classifier output. Thus, the respective values of the steps ΔG, ΔNL, ΔBW as provided by the lookup table depends of the noise level N and/or the classifier output. Optionally, respective values of the steps ΔG, ΔNL, ΔBW may further depend on the current values of the gain G, noise cancelling level NL and/or the beamforming width BW. It is noted that, within certain ranges of the noise level N and/or the classifier output and—optionally—the gain G, the noise cancelling level NL and the beamforming width BW, one or two of the steps ΔG, ΔNL, ΔBW may have a value of 0.

In a different embodiment, values of the steps ΔG, ΔNL, ΔBW may be defined as a mathematical function, e.g., in dependence of the noise level N and/or the classifier output and—optionally—the gain G, the noise cancelling level NL and the beamforming width BW.

In a first adaptation step, the control unit 18 provides the amended values of the gain G, the noise cancelling level NL and the beamforming width BW to the signal processor 11 which applies the amended values instead of the previous values. Herein, preferably, the signal processor 11 slowly fades between the previous values and the amended values of the signal processing parameters.

After a predefined validation time of, e.g., 1 minute from the adaption step, the analysis unit 15 performs a validation step in which the analysis unit 15 again determines the rate of speech RU of the user as described above and again compares the rate of speech RU of the user with the threshold $T_{RU}$. In the preferred embodiment, time intervals outside OV intervals (i.e. time intervals in which the user does not speak) do not contribute to the validation time. In other words, the validation time is only counted within OV intervals.

If the rate of speech RU still falls below the threshold $T_{RU}$ (RU<$T_{RU}$), then the control unit 18 is triggered by the analysis unit 15 again to adapt the gain G, the noise cancelling level NL and the beamforming width BW. To this end, the control unit 18 checks, whether the current values of the noise level N and/or the classifier output are significantly different from the values that led to the first adaptation step.

If this is the case, then the control unit 18 undoes the first adaptation of the gain G, the noise cancelling level NL and the beamforming width BW, determines new values for the steps ΔG, ΔNL, ΔBW from the lookup table and adapts the gain G, the noise cancelling level NL and the beamforming width BW accordingly.

If, otherwise, the current values of the noise level N and/or the classifier output are similar or equal to the values that led to the first adaptation step, then the control unit 18 slightly adapts the values of the gain G, the noise cancelling level NL and the beamforming width BW in a randomly chosen direction, in order to iteratively search for a better adaptation of the signal processing parameters.

In both cases, the validation step is repeated until the rate of speech RU of the user is found to exceed the threshold $T_{RU}$.

The analysis unit 15 then continues to determine the rate of speech RU of the user as described above and to compare the rate of speech RU of the user with the threshold $T_{RU}$. If the rate of speech RU continues to exceed the threshold $T_{RU}$ (RU>$T_{RU}$) for more than a predefined reset time of, e.g., 5 minutes, then the control unit 18 is triggered to undo the first adaptation and, if applicable, all further adaptations of the gain G, the noise cancelling level NL and the beamforming width BW and, thus, to restore the original settings of these signal processing parameters. As a consequence, the signal processor 11 slowly returns to the original signal processing.

If during one or more preceding validation steps, as described above, new (and better suited) values of the steps ΔG, ΔNL, ΔBW are found then, preferably, these new values of the steps ΔG, ΔNL, ΔBW are stored in the lookup table, thus replacing the previously stored values. Hence, the lookup table is successively adapted to the preferences and needs of the user in a self-learning process.

In a test period that precedes the normal operation of the hearing system 1 as described above, the threshold $T_{RU}$ determined so to match the individual needs of the user. To this end, the voice of the user is captured by the hearing instrument 2 during the test phase, and the rate of speech of the user is derived therefrom (as previously described) as a reference which is referred to as the "usual rate of speech" of the user. The user or, e.g., an audiologist may start the test period intentionally by executing a corresponding command, e.g. via the hearing app 3. Typically, the test period will be started in a suited (in particular quiet) listening situation. The test period is terminated by the hearing system 1 if the usual rate of speech of the user has been derived by the analysis unit 15 as a time-averaged value with a sufficient statistical accuracy. The analysis unit 15 then determines the threshold $T_{RU}$ based on the usual rate of speech of the user. E.g. the threshold $T_{RU}$ is determined such that is undershoots the usual rate of speech of the user by a predefined tolerance range. Optionally, the threshold $T_{RU}$ may be provided as function that varies in dependence of the noise level N and/or the classifier output.

As will be appreciated by persons skilled in the art, numerous variations and/or modifications may be made to the invention as shown in the specific examples without departing from the spirit and scope of the invention as broadly described in the claims. The present examples are, therefore, to be considered in all aspects as illustrative and not restrictive. For instance, different from the example described above, the hearing system may consist of a single stand-alone hearing instrument, in which all functional parts of the system (including, i.a., the before-mentioned control unit) are integrated.

The following is a summary list of reference numerals and the corresponding structure used in the above description of the invention:

1 (hearing) system
2 hearing aid
3 hearing app
4 smartphone
5 microphones
7 receiver
9 battery
11 signal processor
12 voice recognition unit
13 voice activity detection module (VAD module)
14 own-voice detection module (OVD module)
15 analysis unit
17 wireless link
18 control unit
ΔG step
ΔNL step
ΔBW step
BW beamforming width
G gain
I input audio signal
N Noise level
NL noise cancelling level
O output audio signal RU rate of speech (of the user)
$T_{RU}$ threshold

The invention claimed is:

1. A method for operating a hearing instrument, which comprises the steps of:
    capturing a sound signal from an environment of the hearing instrument;
    analyzing the sound signal captured to recognize own-voice intervals, in which a user speaks;
    analyzing the sound signal captured, during recognized own-voice intervals, to determine a rate of speech of the user;
    processing the sound signal captured in dependence of a set of signal processing parameters;
    outputting the sound signal to the user of the hearing instrument;
    adapting the set of signal processing parameters if the rate of speech determined falls below a threshold;
    analyzing the sound signal captured to recognize foreign-voice intervals, in which a different speaker speaks;
    during a recognized foreign-voice intervals, analyzing the sound signal captured to determine a rate of speech of the different speaker; and
    varying the adapting of the set of signal processing parameters in dependence of the rate of speech of the different speaker.

2. The method according to claim 1, wherein the set of signal processing parameters includes at least one of:
    a gain applied to the sound signal;
    a parameter of a noise reduction algorithm; and
    a parameter of a beamforming algorithm.

3. The method according to claim 1, wherein the rate of speech of the user is determined based on at least one of:
    word duration;
    rate of syllables;
    rate of words; and
    pauses between consecutive words.

4. The method according to claim 1, wherein the threshold is determined by analyzing the rate of speech of the user during a test period.

5. The method according to claim 1, which further comprises:
    further analyzing the sound signal captured for at least one environmental acoustic feature that characterizes a listening situation of the user; and
    determining the threshold in dependence on the at least one environmental acoustic feature.

6. The method according to claim 1, which further comprises:
    analyzing the sound signal captured for at least one environmental acoustic feature that characterizes a listening situation of the user; and
    varying the adapting of the set of signal processing parameters in dependence on the at least one environmental acoustic feature.

7. The method according to claim 1, which further comprises varying the adapting of the set of signal processing parameters if the rate of speech of the user continues to undershoot the threshold for more than a pre-defined evaluation time from the adapting.

8. The method according to claim 1, which further comprises reversing the adapting of the set of signal processing parameters if the rate of speech of the user continuously exceeds the threshold for more than a pre-defined reset time after the adapting.

9. A hearing system with a hearing instrument, the hearing instrument comprising:
    an input transducer configured to capture a sound signal from an environment of the hearing instrument;
    a voice recognition unit configured to analyze the sound signal to recognize own-voice intervals, in which a user speaks;
    an analysis unit configured to analyze the sound signal to determine a rate of speech of the user;
    a signal processor configured to process the sound signal in dependence on a set of signal processing parameters;
    an output transducer configured to emit the sound signal processed to the user of the hearing instrument;
    a controller configured to adapt the set of signal processing parameters if the rate of speech falls below a threshold;
    said voice recognition unit is configured to analyze the sound signal to recognize foreign-voice intervals, in which a different speaker speaks;
    said analysis unit is configured to analyze the sound signal, during recognized foreign-voice intervals, to determine a rate of speech of the different speaker; and
    said controller is configured to vary an adaptation of the set of signal processing parameters in dependence on the rate of speech of the different speaker.

10. The hearing system according to claim 9, wherein the set of signal processing parameters includes at least one of:
    a gain applied to the sound signal captured;
    a parameter of a noise reduction algorithm; and
    a parameter of a beamforming algorithm.

11. The hearing system according to claim 9, wherein said analysis unit is configured to determine the rate of speech of the user based on at least one of:
    word duration;
    rate of syllables;
    rate of words; and
    pauses between consecutive words.

12. The hearing system according to claim 9, wherein said controller is configured to determine the threshold by analyzing the rate of speech of the user during a test period.

13. The hearing system according to claim 9, wherein:
    said analysis unit is configured to analyze the sound signal for at least one environmental acoustic feature that characterizes a listening situation of the user; and
    said controller is configured to determine the threshold in dependence of the at least one environmental acoustic feature.

14. The hearing system according to claim 9, wherein:
    said analysis unit is configured to analyze the sound signal for at least one environmental acoustic feature that characterizes a listening situation of the user; and
    said controller is configured to vary an adaptation of the set of signal processing parameters in dependence of the at least one environmental acoustic feature.

15. The hearing system according to claim 9, wherein said controller is configured to vary an adaptation of the set of signal processing parameters if the rate of speech of the user continues to undershoot the threshold for more than a pre-defined evaluation time from said adaptation.

16. The hearing system according to claim 9, wherein said controller is configured to reverse an adaptation of the set of signal processing parameters if the rate of speech of the user continuously exceeds the threshold for more than a pre-defined reset time after the adaptation.

* * * * *